(12) United States Patent
Park et al.

(10) Patent No.: US 12,505,782 B2
(45) Date of Patent: Dec. 23, 2025

(54) EMISSION DRIVER AND DISPLAY DEVICE

(71) Applicant: Samsung Display Co., Ltd., Yongin-Si (KR)

(72) Inventors: Gyungsoon Park, Seoul (KR); Sunhwa Lee, Yongin-si (KR); Jaeyong Jang, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 606 days.

(21) Appl. No.: 17/894,311

(22) Filed: Aug. 24, 2022

(65) Prior Publication Data
US 2023/0177999 A1 Jun. 8, 2023

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0819* (2013.01); *G09G 2300/0852* (2013.01); *G09G 2310/08* (2013.01); *G09G 2320/0233* (2013.01); *G09G 2330/021* (2013.01)

(58) Field of Classification Search
None
See application file for complete search history.

(56) References Cited

U.S. PATENT DOCUMENTS

| 10,891,900 B2 * | 1/2021 | Kim | G09G 3/3266 |
| 2017/0301295 A1 * | 10/2017 | Park | G09G 3/3258 |
| 2018/0138256 A1 * | 5/2018 | Han | H10K 59/1213 |
| 2019/0347997 A1 * | 11/2019 | Park | G11C 19/28 |
| 2020/0020266 A1 * | 1/2020 | Feng | G11C 19/28 |
| 2020/0394952 A1 * | 12/2020 | Na | G11C 19/28 |
| 2021/0202677 A1 * | 7/2021 | Kim | H10K 59/131 |
| 2021/0366402 A1 * | 11/2021 | In | G09G 3/296 |
| 2022/0013078 A1 * | 1/2022 | Kim | G09G 3/3688 |
| 2022/0122554 A1 * | 4/2022 | Liao | G02F 1/136209 |
| 2022/0199034 A1 * | 6/2022 | Yun | G11C 19/28 |
| 2022/0335900 A1 * | 10/2022 | Feng | G11C 19/28 |

(Continued)

FOREIGN PATENT DOCUMENTS

| KR | 10-0719670 B1 | 5/2007 |
| KR | 10-2017-0119786 A | 10/2017 |

(Continued)

*Primary Examiner* — Patrick N Edouard
(74) *Attorney, Agent, or Firm* — Innovation Counsel LLP

(57) ABSTRACT

An emission driver includes a plurality of stages. Each stage includes an input block that transfers an input signal to a control node, a control block that controls an inverted control node and applies a third low gate voltage to the inverted control node in response to a voltage of the control node, an emission signal output block that outputs a high gate voltage as an emission signal in response to the voltage of the control node and outputs a first low gate voltage as the emission signal in response to a voltage of the inverted control node, and a carry signal output block that outputs the high gate voltage as a carry signal in response to the voltage of the control node and outputs a second low gate voltage different from the first low gate voltage as the carry signal in response to the voltage of the inverted control node. The third low gate voltage is different from the first low gate voltage and the second low gate voltage.

20 Claims, 12 Drawing Sheets

(56) References Cited

U.S. PATENT DOCUMENTS

| | | | |
|---|---|---|---|
| 2024/0257781 A1* | 8/2024 | Cao | G09G 3/20 |
| 2025/0148977 A1* | 5/2025 | Lee | G09G 3/3233 |

FOREIGN PATENT DOCUMENTS

| | | |
|---|---|---|
| KR | 10-2018-0042754 A | 4/2018 |
| KR | 10-2018-0079102 A | 7/2018 |
| KR | 10-2020-0048784 A | 5/2020 |
| KR | 10-2020-0128277 A | 11/2020 |
| KR | 10-2241774 B1 | 4/2021 |

* cited by examiner

EMISSION DRIVER AND DISPLAY DEVICE

CROSS-REFERENCE TO RELATED APPLICATION(S)

This application claims priority under 35 USC § 119 to Korean Patent Application No. 10-2021-0174740, filed on Dec. 8, 2021, in the Korean Intellectual Property Office (KIPO), the content of which is herein incorporated by reference in its entirety.

BACKGROUND

1. Field

Embodiments of the present inventive concept relate to a display device, and more particularly to an emission driver and a display device including the emission driver.

2. Description of the Related Art

A display device, such as an organic light emitting diode (OLED) display device, may include a display panel having a plurality of pixels, a data driver providing data signals to the plurality of pixels, a scan driver providing scan signals to the plurality of pixels, an emission driver providing emission signals to the plurality of pixels, and a controller controlling the data driver, the scan driver and the emission driver.

Recently, an OLED display device in which each pixel includes oxide transistors or n-type metal oxide semiconductor (NMOS) transistors is being developed. Accordingly, an emission driver suitable for the pixel including the oxide transistors or the NMOS transistors is required.

SUMMARY

Some embodiments provide an emission driver having improved operation reliability.

Some embodiments provide a display device including an emission driver having improved operation reliability.

According to embodiments, there is provided an emission driver including a plurality of stages. Each stage includes an input block that transfers an input signal to a control node, a control block that controls an inverted control node, and applies a third low gate voltage to the inverted control node in response to a voltage of the control node, an emission signal output block that outputs a high gate voltage as an emission signal in response to the voltage of the control node, and outputs a first low gate voltage as the emission signal in response to a voltage of the inverted control node, and a carry signal output block that outputs the high gate voltage as a carry signal in response to the voltage of the control node, and outputs a second low gate voltage different from the first low gate voltage as the carry signal in response to the voltage of the inverted control node. The third low gate voltage is different from the first low gate voltage and the second low gate voltage.

In embodiments, the second low gate voltage may be lower than the first low gate voltage.

In embodiments, all transistors included in each stage may be n-type metal oxide semiconductor (NMOS) transistors.

In embodiments, the control block may include a first transistor including a gate coupled to the control node, a first terminal coupled to the inverted control node, and a second terminal receiving the third low gate voltage.

In embodiments, the control node may include a first control node disposed between a first stress relieving transistor and the input block and a second control node disposed between the first stress relieving transistor and the emission signal output block. The gate of the first transistor may be coupled to the first control node.

In embodiments, the first stress relieving transistor may include a gate receiving the high gate voltage, a first terminal coupled to the first control node, and a second terminal coupled to the second control node.

In embodiments, the emission signal output block may include a second transistor including a gate coupled to the inverted control node, a first terminal coupled to an emission signal output node through which the emission signal is output, and a second terminal receiving the first low gate voltage. The carry signal output block may include a third transistor including a gate coupled to the inverted control node, a first terminal coupled to a carry signal output node through which the carry signal is output, and a second terminal receiving the second low gate voltage.

In embodiments, the third low gate voltage may be lower by a threshold voltage or more of the second transistor than the first low gate voltage and may be lower than the second low gate voltage.

In embodiments, the emission signal output block may further include a fourth transistor including a gate coupled to the control node, a first terminal receiving the high gate voltage, and a second terminal coupled to the emission signal output node, and a first capacitor including a first electrode coupled to the inverted control node, and a second electrode receiving the first low gate voltage. The carry signal output block may further include a fifth transistor including a gate coupled to the control node, a first terminal receiving the high gate voltage, and a second terminal coupled to the carry signal output node, and a second capacitor including a first electrode receiving the high gate voltage, and a second electrode coupled to the carry signal output node.

In embodiments, a capacitance of the second capacitor may be greater than a capacitance of the first capacitor.

In embodiments, the input block may include a sixth transistor including a gate receiving a first clock signal, a first terminal receiving the input signal, and a second terminal coupled to the control node.

In embodiments, each stage may further include a boosting block boosting the voltage of the control node.

In embodiments, the boosting block may include a seventh transistor including a gate coupled to the control node, a first terminal receiving a second clock signal, and a second terminal, a third capacitor including a first electrode coupled to the control node, and a second electrode coupled to the second terminal of the seventh transistor, and an eighth transistor including a gate coupled to the inverted control node, a first terminal coupled to the second electrode of the third capacitor, and a second terminal receiving the first low gate voltage.

In embodiments, the inverted control node may include a first inverted control node disposed between the boosting block and a fourth capacitor, a second inverted control node disposed between the fourth capacitor and a twelfth transistor, and a third inverted control node disposed between the twelfth transistor and the emission signal output block, and the control block may include a ninth transistor including a gate coupled to the control node, a first terminal receiving a first clock signal, and a second terminal coupled to the first inverted control node, a tenth transistor including a gate receiving the first clock signal, a first terminal receiving the high gate voltage, and a second terminal coupled to the first inverted control node, an eleventh transistor including a gate coupled to the first inverted control node, a first terminal receiving a second clock signal, and a second terminal coupled to the second inverted control node, the fourth capacitor including a first electrode coupled to the first inverted control node, and a second electrode coupled to the second inverted control node, the twelfth transistor including a gate receiving the second clock signal, a first terminal coupled to the second inverted control node, and a second terminal coupled to the third inverted control node, and a first transistor including a gate coupled to the control node, a first terminal coupled to the third inverted control node, and a second terminal receiving the third low gate voltage.

In embodiments, the control block may further include a second stress relieving transistor connected between the boosting block and the fourth capacitor, and including a gate receiving the high gate voltage.

In embodiments, each stage may further include a reset transistor resetting the control node in response to a global reset signal.

In embodiments, the reset transistor may include a gate receiving the global reset signal, a first terminal coupled to the control node, and a second terminal receiving the first low gate voltage.

According to embodiments, there is provided an emission driver including a plurality of stages. Each stage includes a first transistor including a gate coupled to a first control node, a first terminal coupled to a third inverted control node, and a second terminal receiving a third low gate voltage, a first stress relieving transistor including a gate receiving a high gate voltage, a first terminal coupled to the first control node, and a second terminal coupled to a second control node, a second transistor including a gate coupled to the third inverted control node, a first terminal coupled to an emission signal output node through which an emission signal is output, and a second terminal receiving a first low gate voltage, a third transistor including a gate coupled to the third inverted control node, a first terminal coupled to a carry signal output node through which a carry signal is output, and a second terminal receiving a second low gate voltage, a fourth transistor including a gate coupled to the second control node, a first terminal receiving the high gate voltage, and a second terminal coupled to the emission signal output node, a first capacitor including a first electrode coupled to the third inverted control node and a second electrode receiving the first low gate voltage, a fifth transistor including a gate coupled to the second control node, a first terminal receiving the high gate voltage, and a second terminal coupled to the carry signal output node, a second capacitor including a first electrode receiving the high gate voltage and a second electrode coupled to the carry signal output node, a sixth transistor including a gate receiving a first clock signal, a first terminal receiving an input signal, and a second terminal coupled to the first control node, a seventh transistor including a gate coupled to the second control node, a first terminal receiving a second clock signal, and a second terminal, a third capacitor including a first electrode coupled to the second control node and a second electrode coupled to the second terminal of the seventh transistor, an eighth transistor including a gate coupled to a first inverted control node, a first terminal coupled to the second electrode of the third capacitor, and a second terminal receiving the first low gate voltage, a ninth transistor including a gate coupled to the first control node, a first terminal receiving the first clock signal, and a second terminal coupled to the first inverted control node, a tenth transistor including a gate receiving the first clock signal, a first terminal receiving the high gate voltage, and a second terminal coupled to the first inverted control node, an eleventh transistor including a gate coupled to the first inverted control node, a first terminal receiving the second clock signal, and a second terminal coupled to a second inverted control node, a fourth capacitor including a first electrode coupled to the first inverted control node and a second electrode coupled to the second inverted control node, a twelfth transistor including a gate receiving the second clock signal, a first terminal coupled to the second inverted control node, and a second terminal coupled to the third inverted control node, a second stress relieving transistor including a gate receiving the high gate voltage, a first terminal coupled to the first inverted control node, and a second terminal coupled to the first electrode of the fourth capacitor, and a reset transistor including a gate receiving a global reset signal, a first terminal coupled to the first control node, and a second terminal receiving the first low gate voltage.

In embodiments, the third low gate voltage may be lower by a threshold voltage or more of the second transistor than the first low gate voltage, and may be lower than the second low gate voltage.

According to embodiments, there is provided a display device including a display panel including a plurality of pixels, a data driver providing data signals to the plurality of pixels, a scan driver providing scan signals to the plurality of pixels, an emission driver including a plurality of stages providing emission signals to the plurality of pixels, and a controller controlling the data driver, the scan driver and the emission driver. Each stage includes an input block transferring an input signal to a control node, a control block controlling an inverted control node and applying a third low gate voltage to the inverted control node in response to a voltage of the control node, an emission signal output block outputting a high gate voltage as the emission signal in response to the voltage of the control node and outputting a first low gate voltage as an emission signal in response to a voltage of the inverted control node, and a carry signal output block outputting the high gate voltage as a carry signal in response to the voltage of the control node and outputting a second low gate voltage different from the first low gate voltage as the carry signal in response to the voltage of the inverted control node. The third low gate voltage is different from the first low gate voltage and the second low gate voltage.

As described above, in an emission driver and a display device according to embodiments, a third low gate voltage applied to an inverted control node of each stage may be different from a first low gate voltage used as a low voltage of an emission signal and a second low gate voltage used as a low voltage of a carry signal. Accordingly, a leakage current in each stage of the emission driver may be prevented or reduced, and operation reliability of the emission driver may be improved.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Hereinafter, embodiments of the present inventive concept will be explained in detail with reference to the accompanying drawings.

Figure 1:
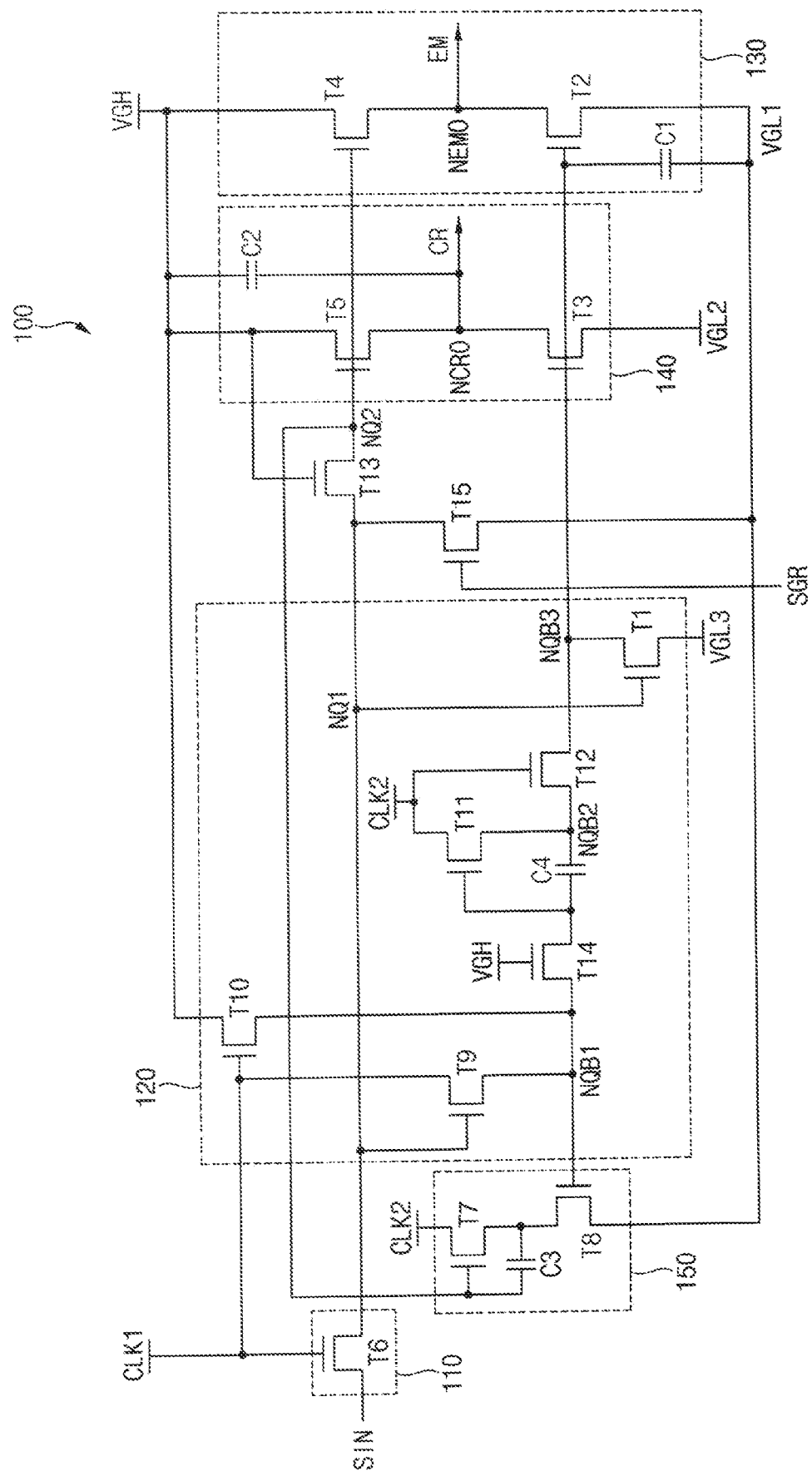
FIG. 1 is a circuit diagram illustrating each stage included in an emission driver according to embodiments.

FIG. 1 is a circuit diagram illustrating each stage included in an emission driver according to embodiments.

Referring to FIG. 1, an emission driver according to embodiments may include a plurality of stages. Each stage 100 may include an input block 110 that transfers an input signal SIN to a control node NQ1 and NQ2, a control block 120 that controls an inverted control node NQB1, NQB2 and NQB3, an emission signal output block 130 that outputs an emission signal EM based on a voltage of the control node NQ1 and NQ2 and a voltage of the inverted control node NQB1, NQB2 and NQB3, and a carry signal output block 140 that outputs a carry signal CR based on the voltage of the control node NQ1 and NQ2 and the voltage of the inverted control node NQB1, NQB2 and NQB3. In some embodiments, each stage 100 may further include a boosting block 150 that boosts the voltage of the control node NQ1 and NQ2.

In some embodiments, each stage 100 may further include a first stress relieving transistor T13 coupled between the control nodes NQ1 and NQ2. In this case, the control node NQ1 and NQ2 may be divided into a first control node NQ1 and a second control node NQ2 by the first stress relieving transistor T13. In some embodiments, the inverted control node NQB1, NQB2 and NQB3 may be divided into a first inverted control node NQB1, a second inverted control node NQB2 and a third inverted control node NQB3, and each stage 100 or the control block 120 may include a second stress relieving transistor T14 coupled to the first inverted control node NQB1. In some embodiments, each stage 100 may further include a reset transistor T15 that resets the control node NQ1 and NQ2 (e.g., the first control node NQ1) in response to a global reset signal SGR.

The input block 110 may transfer the input signal SIN to the first control node NQ1 in response to a first clock signal CLK1. The input signal SIN at the first control node NQ1 may be transferred to the second control node NQ2 via the first stress relieving transistor T13. In some embodiments, the input block 110 of a first one of the plurality of stages may receive an emission start signal FLM as the input signal SIN, and each of the remaining ones of the plurality of stages may receive the carry signal CR of a previous stage as the input signal SIN. In some embodiments, as illustrated in FIG. 1, the input block 110 may include a sixth transistor T6 including a gate receiving the first clock signal CLK1, a first terminal receiving the input signal SIN, and a second terminal coupled to the first control node NQ1.

The control block 120 may control the first, second and third inverted control nodes NQB1, NQB2 and NQB3, and may apply a third low gate voltage VGL3 to the third inverted control node NQB3 in response to the voltage of the first control node NQ1. In some embodiments, the control block 120 may include a ninth transistor T9, a tenth transistor T10, the second stress relieving transistor T14, an eleventh transistor T11, a fourth capacitor C4, a twelfth transistor T12 and a first transistor T1.

The ninth transistor N9 may transfer the first clock signal CLK1 to the first inverted control node NQB1 in response to the voltage of the first control node NQ1. In some embodiments, as illustrated in FIG. 1, the ninth transistor N9 may include a gate coupled to the first control node NQ1, a first terminal receiving the first clock signal CLK1, and a second terminal coupled to the first inverted control node NQB1.

The tenth transistor T10 may transfer a high gate voltage VGH to the first inverted control node NQB1 in response to the first clock signal CLK1. In some embodiments, as illustrated in FIG. 1, the tenth transistor T10 may include a gate receiving the first clock signal CLK1, a first terminal receiving the high gate voltage VGH, and a second terminal coupled to the first inverted control node NQB1.

The second stress relieving transistor T14 may be coupled to the first inverted control node NQB1. The second stress relieving transistor T14 may prevent or reduce a boosted voltage at a first electrode of the fourth capacitor C4 from being transferred to eighth, ninth and tenth transistors T8, T9 and T10, and thus stresses to the eighth, ninth and tenth transistors T8, T9 and T10 may be relieved or relaxed. In some embodiments, as illustrated in FIG. 1, the second stress relieving transistor T14 may include a gate receiving the high gate voltage VGH, a first terminal coupled to the first inverted control node NQB1, or the second terminals of the ninth and tenth transistors T9 and T10, and a second terminal coupled to the first electrode of the fourth capacitor C4.

The eleventh transistor T11 may transfer a second clock signal CLK2 to the second inverted control node NQB2 in response to the voltage of the first inverted control node NQB1, or the voltage of the first electrode of the fourth capacitor C4. In some embodiments, as illustrated in FIG. 1, the eleventh transistor T11 may include a gate coupled to the first inverted control node NQB1 via the second stress relieving transistor T14, or the first electrode of the fourth capacitor C4, a first terminal receiving the second clock signal CLK2, and a second terminal coupled to the second inverted control node NQB2.

The fourth capacitor C4 may boost the voltage of the first inverted control node NQB1, or a voltage of the gate of the eleventh transistor T11. The voltage of the gate of the eleventh transistor T11 may be boosted by the fourth capacitor C4, and thus the eleventh transistor T11 may readily transfer the second clock signal CLK2 having a high level (e.g., a voltage level of the high gate voltage VGH) to the second inverted control node NQB2. In some embodiments, as illustrated in FIG. 1, the fourth capacitor C4 may include a first electrode coupled to the gate of the eleventh transistor T11 and the first inverted control node NQB1 via the second stress relieving transistor T14, or the second terminal of the second stress relieving transistor T14, and a second electrode coupled to the second inverted control node NQB2.

The twelfth transistor T12 may couple the second inverted control node NQB2 to the third inverted control node NQB3 in response to the second clock signal CLK2. In some embodiments, as illustrated in FIG. 1, the twelfth transistor T12 may include a gate receiving the second clock signal CLK2, a first terminal coupled to the second inverted control node NQB2, and a second terminal coupled to the third inverted control node NQB3.

The first transistor T1 may transfer the third low gate voltage VGL3 to the third inverted control node NQB3 in response to the voltage of the first control node NQ1. In some embodiments, as illustrated in FIG. 1, the first transistor T1 may include a gate coupled to the first control node NQ1, a first terminal coupled to the third inverted control node NQB3, and a second terminal receiving the third low gate voltage VGL3. Although FIG. 1 illustrates an example where the gate of the first transistor T1 is coupled to the first control node NQ1, in other embodiments, the gate of the first transistor T1 may be coupled to the second control node NQ2.

The emission signal output block 130 may output the high gate voltage VGH as the emission signal EM in response to the voltage of the second control node NQ2, and may output a first low gate voltage VGL1 as the emission signal EM in response to the voltage of the inverted control node NQB3. In some embodiment, the emission signal output block 130 may include a second transistor T2, a fourth transistor T4 and a first capacitor C1.

The second transistor T2 may transfer the first low gate voltage VGL1 to an emission signal output node NEMO in response to the voltage of the third inverted control node NQB3. The emission signal output node NEMO may be a node at which the emission signal EM is output. In some embodiments, as illustrated in FIG. 1, the second transistor T2 may include a gate coupled to the third inverted control node NQB3, a first terminal coupled to the emission signal output node NEMO, and a second terminal receiving the first low gate voltage VGL1.

The fourth transistor T4 may transfer the high gate voltage VGH to the emission signal output node NEMO in response to the voltage of the second control node NQ2. In some embodiments, as illustrated in FIG. 1, the fourth transistor T4 may include a gate coupled to the second control node NQ2, a first terminal receiving the high gate voltage VGH, and a second terminal coupled to the emission signal output node NEMO.

The first capacitor C1 may stabilize the voltage of the third inverted control node NQB3. In some embodiments, as illustrated in FIG. 1, the first capacitor C1 may include a first electrode coupled to the third inverted control node NQB3, and a second electrode receiving the first low gate voltage VGL1.

The carry signal output block 140 may output the high gate voltage VGH as the carry signal CR in response to the voltage of the second control node NQ2, and may output a second low gate voltage VLG2 different from the first low gate voltage VGL1 as the carry signal CR in response to the voltage of the third inverted control node NQB3. In some embodiments, the second low gate voltage VGL2 may be lower than the first low gate voltage VGL1. Thus, the first low gate voltage VGL1 used as a low voltage of the emission signal EM may be higher than the second low gate voltage VGL2 used as a low voltage of the carry signal CR. In this case, a leakage current from the emission signal output node NEMO through the second transistor T2 to a line of the first low gate voltage VGL1 may be reduced, and a waveform distortion of the emission signal EM may be reduced. In some embodiments, the carry signal output block 140 may include a third transistor T3, a fifth transistor T5 and a second capacitor C2.

The third transistor T3 may transfer the second low gate voltage VGL2 to a carry signal output node NCRO in response to the voltage of the third inverted control node NQB3. The carry signal output node NCRO may be a node at which the carry signal CR is output. In some embodiments, as illustrated in FIG. 1, the third transistor T3 may include a gate coupled to the third inverted control node NQB3, a first terminal coupled to the carry signal output node NCRO, and a second terminal receiving the second low gate voltage VGL2.

The fifth transistor T5 may transfer the high gate voltage VGH to the carry signal output node NCRO in response to the voltage of the second control node NQ2. In some embodiments, as illustrated in FIG. 1, the fifth transistor T5 may include a gate coupled to the second control node NQ2, a first terminal receiving the high gate voltage VGH, and a second terminal coupled to the carry signal output node NCRO.

The second capacitor C2 may reduce a waveform distortion of the carry signal CR. In some embodiments, as illustrated in FIG. 1, the second capacitor C2 may include a first electrode receiving the high gate voltage VGH, and a second electrode coupled to the carry signal output node NCRO.

In some embodiments, a capacitance of the second capacitor C2 may be greater than capacitances of other capacitors C1, C3 and C4 included in the stage 100. For example, a capacitance of the first capacitor C1 may be about 0.1 pF, a capacitance of the third capacitor C3 may be about 0.17 pF, a capacitance of the fourth capacitor C4 may be about 0.1 pF, and a capacitance of the second capacitor C2 may be about 0.4 pF. In this case, the waveform distortion of the carry signal CR may be further reduced by the second capacitor C2 having the large capacitance.

The boosting block 150 may boost the voltage of the second control node NQ2. The fourth and fifth transistors T4 and T5 may readily transfer the high gate voltage VGH based on the boosted voltage of the second control node NQ2. In some embodiments, the boosting block 150 may include a seventh transistor T7, a third capacitor C3 and an eighth transistor T8.

The seventh transistor T7 may transfer the second clock signal CLK2 to a second electrode of the third capacitor C3 in response to the voltage of the second control node NQ2. In some embodiments, as illustrated in FIG. 1, the seventh transistor T7 may include a gate coupled to the second control node NQ2, a first terminal receiving the second clock signal CLK2, and a second terminal coupled to the second electrode of the third capacitor C3.

The third capacitor C3 may boost the voltage of the second control node NQ2. The voltage of the second control node NQ2, or the voltage of the gates of the fourth and fifth transistors T4 and T5 may be boosted by the third capacitor C3, and thus the fourth and fifth transistors T4 and T5 may readily transfer the high gate voltage VGH to the emission signal output node NEMO and the carry signal output node NCRO, respectively. In some embodiments, as illustrated in FIG. 1, the third capacitor C3 may include a first electrode coupled to the second control node NQ2, and the second electrode coupled to the second terminal of the seventh transistor T7.

The eighth transistor T8 may transfer the first low gate voltage VGL1 to the second electrode of the third capacitor C3 in response to the voltage of the first inverted control node NQB1. In some embodiments, as illustrated in FIG. 1, the eighth transistor T8 may include a gate coupled to the first inverted control node NQB1, a first terminal coupled to the second electrode of the third capacitor C3, and a second terminal receiving the first low gate voltage VGL1.

The first stress relieving transistor T13 may prevent or reduce the boosted voltage of the second control node NQ2 from being transferred to the first, sixth, ninth and fifteenth transistors T1, T6, T9 and T15, and thus stresses to the first, sixth, ninth and fifteenth transistors T1, T6, T9 and T15 may be relieved or relaxed. In some embodiments, as illustrated in FIG. 1, the first stress relieving transistor T13 may include a gate receiving the high gate voltage VGH, a first terminal coupled to the first control node NQ1, and a second terminal coupled to the second control node NQ2.

The reset transistor T15 may reset the first control node NQ1 to the first low gate voltage VGL1 in response to the global reset signal SGR. In some embodiments, the global reset signal SGR may be substantially simultaneously applied to the plurality of stages when a display device including the emission driver is powered on, and the reset transistors T15 of the plurality of stages may substantially simultaneously reset the first control nodes NQ1 of the plurality of stages to the first low gate voltage VGL1 in response to the global reset signal SGR. Further, the first low gate voltage VGL1 at the first control nodes NQ1 of the plurality of stages may be transferred to the second control nodes NQ2 of the plurality of stages by the first stress relieving transistors T13 of the plurality of stages, and thus the second control nodes NQ2 of the plurality of stages also may be reset to the first low gate voltage VGL1. In some embodiments, as illustrated in FIG. 1, the reset transistor T15 may include a gate receiving the global reset signal SGR, a first terminal coupled to the first control node NQ1, and a second terminal receiving the first low gate voltage VGL1.

In some embodiments, as illustrated in FIG. 1, all transistors T1 through T15 included in each stage 100 may be n-type metal oxide semiconductor (NMOS) transistors or oxide transistors. Accordingly, the emission driver including the stage 100 having the NMOS transistors or the oxide transistors may be suitable for pixels implemented with NMOS transistors or oxide transistors and for a display panel including the pixels.

In the stage 100 of the emission driver according to embodiments, the third low gate voltage VGL3 applied to the third inverted control node NQB3 may be different from the first low gate voltage VGL1 used as the low voltage of the emission signal EM and the second low gate voltage VGL2 used as the low voltage of the carry signal CR. In some embodiments, the third low gate voltage VGL3 may be lower than the first low gate voltage VGL1 and the second low gate voltage VGL2. In this case, while the second transistor T2 and the third transistor T3 are turned off, a low voltage of the third inverted control node NQB3, or a voltage of the gate of the second transistor T2 and a voltage of the gate of the third transistor T3 may be lower than a voltage of the second terminal (e.g., a source) of the second transistor T2 and a voltage of the second terminal (e.g., a source) of the third transistor T3, and thus the second transistor T2 and the third transistor T3 may have negative gate-source voltages Vgs. Accordingly, since the second transistor T2 and the third transistor T3 have the negative gate-source voltages Vgs, leakage currents through the second transistor T2 and the third transistor T3 may be prevented or reduced. Since the leakage current from the carry signal output node NCRO through the third transistor T3 to a line of the second low gate voltage VGL2 is reduced, the waveform distortion of the carry signal CR may be reduced. Further, a leakage current from the third inverted control node NQB3 through the twelfth transistor T12 and the eleventh transistor T11 also may be prevented or reduced. In some embodiments, the third low gate voltage VGL3 may be lower by a threshold voltage or more of any one of the second transistor T2 and the third transistor T3 than the first low gate voltage VGL1. In some embodiments, the third low gate voltage VGL3 may be lower by a threshold voltage or more of the second transistor T2 than the first low gate voltage VGL1. In some embodiments, the third low gate voltage VGL3 may be lower by a threshold voltage or more of the third transistor T3 than the second low gate voltage VGL2. In some embodiments, the third low gate voltage VGL3 may be lower by a threshold voltage or more of one of the second transistor T2 and the third transistor T3 which has a greater threshold voltage than one of the first low gate voltage VGL1 and the second low gate voltage VGL2 which has a lower gate voltage. In this case, the leakage current through the second transistor T2 may be further reduced.

In a case where the first low gate voltage VGL1 or the second low gate voltage VGL2 is used as the low voltage of the third inverted control node NQB3, the second transistor T2 or the third transistor T3 may have a positive gate-source voltage or a zero gate-source voltage. In this case, while the second transistor T2 and the third transistor T3 are turned off, a leakage current through the second transistor T2 and/or the third transistor T3 may occur, and a waveform of the emission signal EM and/or the carry signal CR may be distorted. However, in the stage 100 of the emission driver according to embodiments, the third low gate voltage VGL3 lower than the first low gate voltage VGL1 and the second low gate voltage VGL2 may be used as the low voltage of the third inverted control node NQB3. Accordingly, the leakage current within each stage 100 may be prevented or reduced, and operation reliability of the emission driver may be improved.

Hereinafter, an example of an operation of the stage 100 will be described below with reference to FIGS. 1 through 6.

Figure 2:
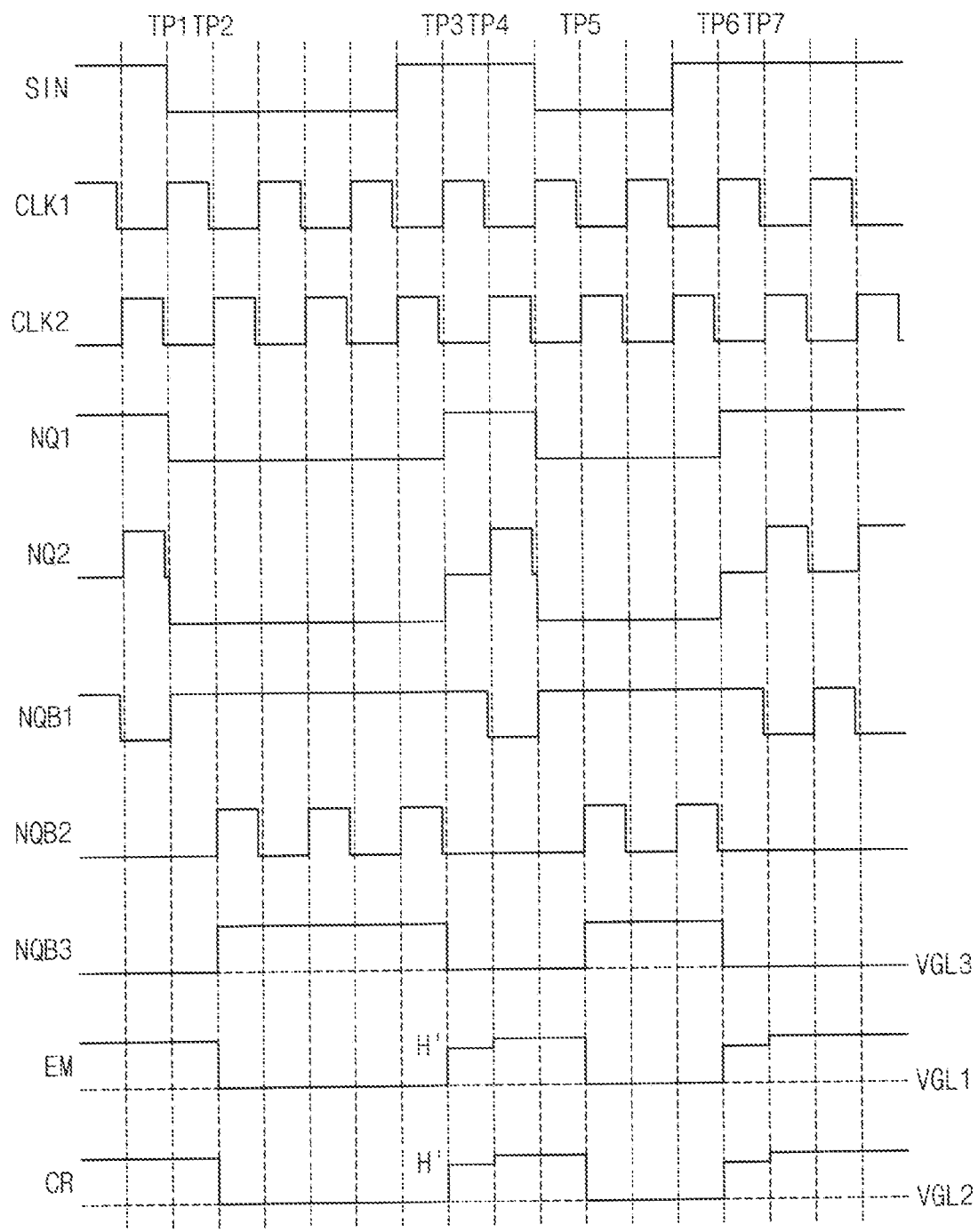
FIG. 2 is a timing diagram for describing an example of an operation of a stage of FIG. 1.
Figure 3:
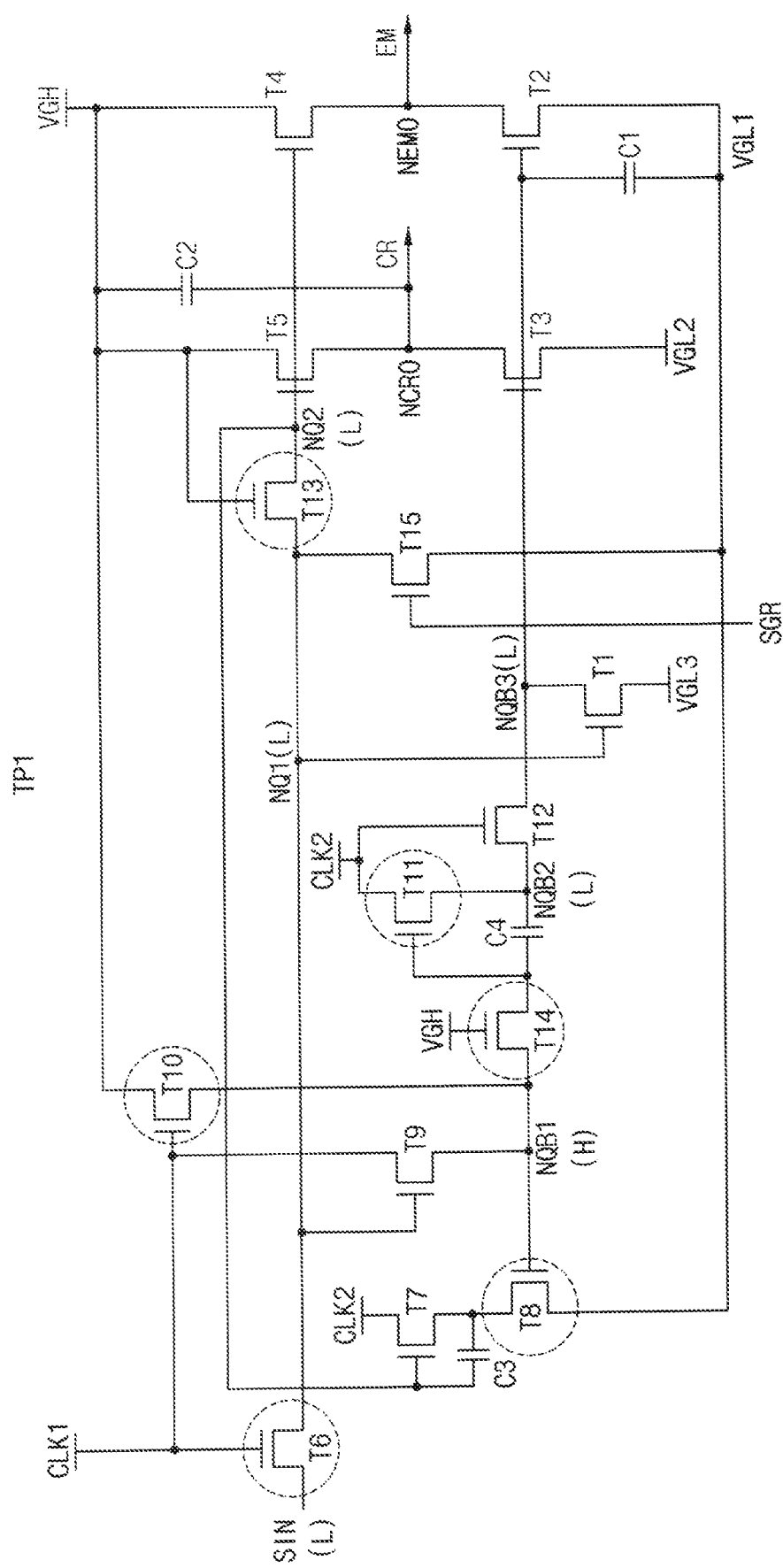
FIG. 3 is a circuit diagram for describing an example of an operation of a stage of FIG. 1 at a first time point.
Figure 4:
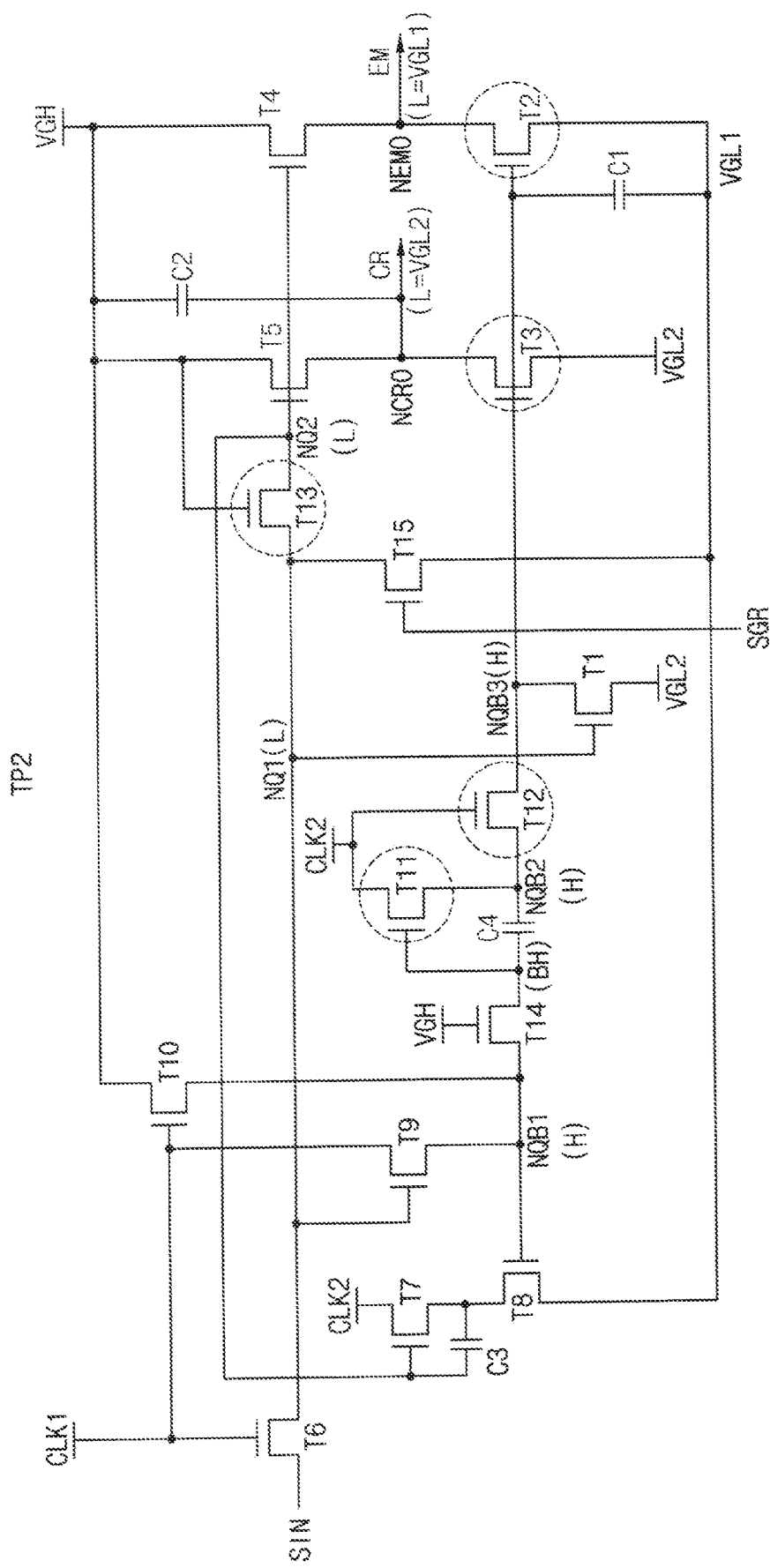
FIG. 4 is a circuit diagram for describing an example of an operation of a stage of FIG. 1 at a second time point.
Figure 5:
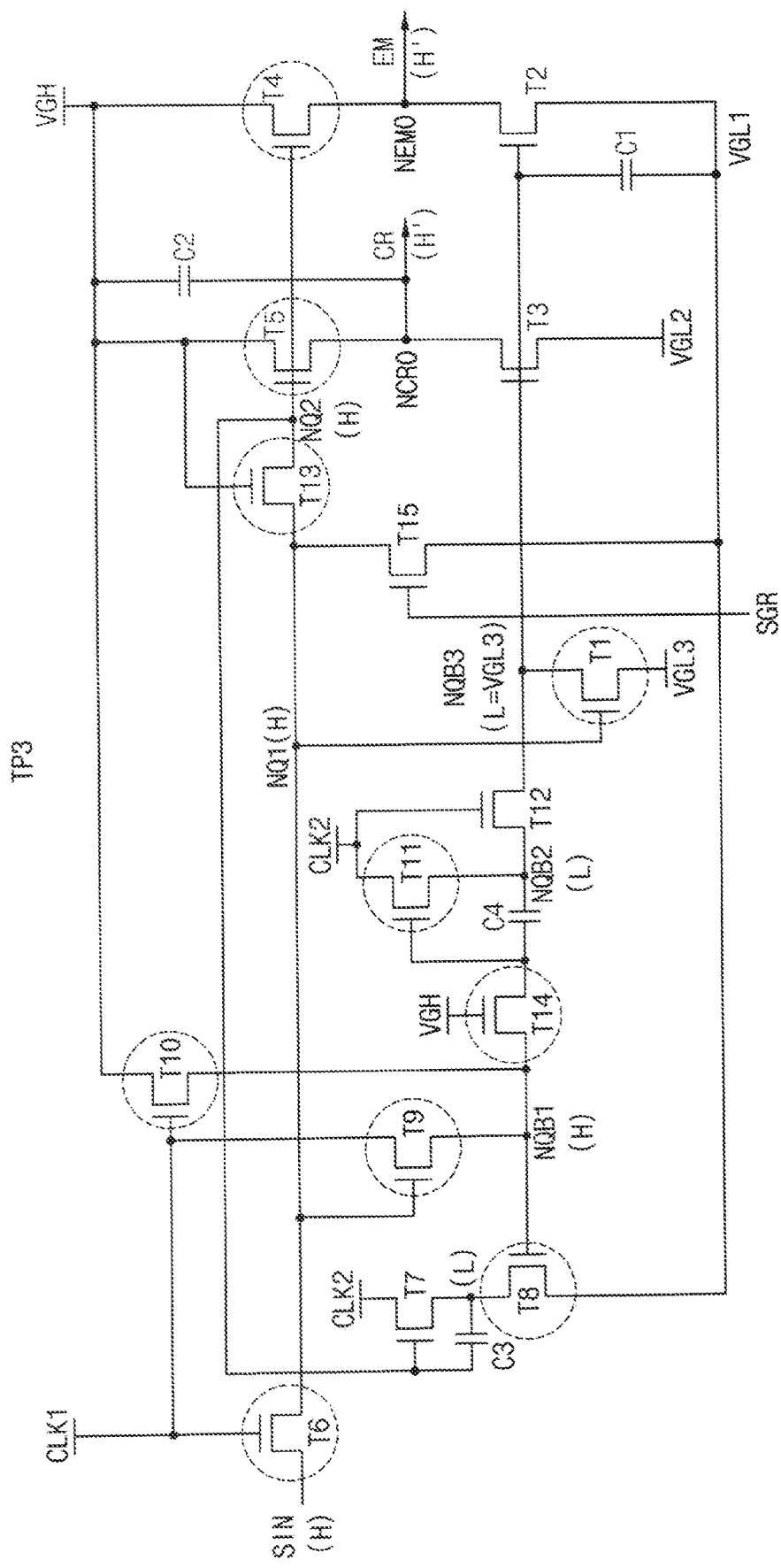
FIG. 5 is a circuit diagram for describing an example of an operation of a stage of FIG. 1 at a third time point.
Figure 6:
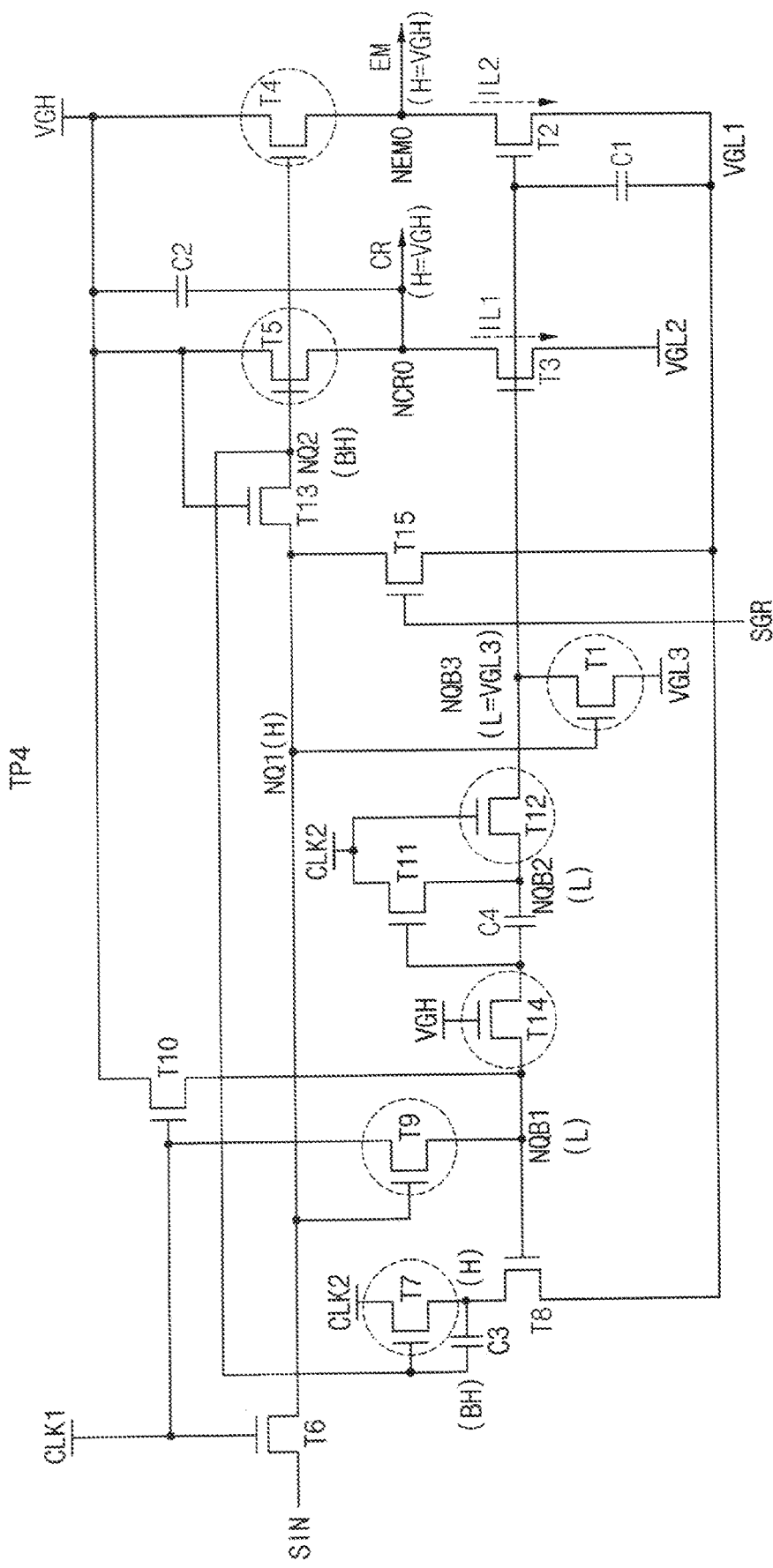
FIG. 6 is a circuit diagram for describing an example of an operation of a stage of FIG. 1 at a fourth time point.

FIG. 2 is a timing diagram for describing an example of an operation of a stage of FIG. 1, FIG. 3 is a circuit diagram for describing an example of an operation of a stage of FIG. 1 at a first time point, FIG. 4 is a circuit diagram for describing an example of an operation of a stage of FIG. 1 at a second time point, FIG. 5 is a circuit diagram for describing an example of an operation of a stage of FIG. 1 at a third time point, and FIG. 6 is a circuit diagram for describing an example of an operation of a stage of FIG. 1 at a fourth time point.

Referring to FIGS. 1 and 2, each stage 100 may receive an input signal SIN, a first clock signal CLK1 and a second clock signal CLK2. The input signal SIN may be an emission start signal in a first stage of a plurality of stages included in an emission driver and may be a carry signal CR output from a previous stage in the remaining ones of the plurality of stages. The first and second clock signals CLK1 and CLK2 may have different phases (e.g., opposite phases). In some embodiments, as illustrated in FIG. 2, with respect to each of the first and second clock signals CLK1 and CLK2, an on period (e.g., a high period) may be shorter than an off period (e.g., a low period). In other embodiments, the on period may be longer than or equal to the off period.

At a first time point TP1, as illustrated in FIGS. 2 and 3, the input signal SIN having a low level L may be applied, and the first clock signal CLK1 may be changed to a high level H. Sixth and tenth transistors T6 and T10 may be turned on in response to the first clock signal CLK1. The sixth transistor T6 may transfer the input signal SIN having the low level L to a first control node NQ1, and a voltage of the first control node NQ1 may become the low level L. First and second stress relieving transistors T13 and T14 may be turned on in response to a high gate voltage VGH. The first stress relieving transistor T13 may transfer the voltage of the first control node NQ1 having the low level L to a second control node NQ2, and a voltage of the second control node NQ2 may become the low level L. The tenth transistor T10 may transfer the high gate voltage VGH to a first inverted control node NQB1, and a voltage of the first inverted control node NQB1 may become the high level H. Eighth and eleventh transistors T8 and T11 may be turned on in response to the voltage of the first inverted control node NQB1 having the high level H. Voltages of second and third inverted control nodes NQB2 and NQB3 may have the low level L.

At a second time point TP2, as illustrated in FIGS. 2 and 4, the voltages of the first and second control nodes NQ1 and NQ2 may be maintained as the low level L, and the second clock signal CLK2 may be changed to the high level H. Further, the voltage of the first inverted control node NQB1 may be maintained as the high level H, and a turn-on state of the eleventh transistor T11 may be maintained. If the second clock signal CLK2 is changed to the high level H while the eleventh transistor T11 is turned on, the voltage of the second inverted control node NQB2 may become the high level H, and a voltage of a first electrode of a fourth capacitor C4, or a voltage of a gate of the eleventh transistor T11 may become a boosted high level BH. Thus, the voltage of the gate of the eleventh transistor T11 may be boosted by the fourth capacitor C4, and thus the eleventh transistor T11 may readily transfer the second clock signal CLK2 having the high level H to the second inverted control node NQB2. Although the voltage of the first electrode of the fourth capacitor C4 has the boosted high level BH, a second stress relieving transistor T14 may prevent or reduce the boosted voltage of the first electrode of the fourth capacitor C4 from being transferred to the first inverted control node NQB1. Accordingly, stresses to the eighth, ninth and tenth transistors T8, T9 and T10 coupled to the first inverted control node NQB1 may be relieved or relaxed. A twelfth transistor T12 may be turned on in response to the second clock signal CLK2. The twelfth transistor T12 may transfer the voltage of the second inverted control node NQB2 having the high level H to the third inverted control node NQB3, and thus the voltage of the third inverted control node NQB3 may become the high level H. Second and third transistors T2 and T3 may be turned on in response to the voltage of the third inverted control node NQB3 having the high level H. The second transistor T2 may transfer a first low gate voltage VGL1 to an emission signal output node NEMO, and the first low gate voltage VGL1 may be output as an emission signal EM having the low level L to the emission signal output node NEMO. The third transistor T3 may transfer a second low gate voltage VGL2 to a carry signal output node NCRO, and the second low gate voltage VGL2 may be output as the carry signal CR having the low level L to the carry signal output node NCRO.

During a period from the second time point TP2 to a third time point TP3, the voltages of the first and second control nodes NQ1 and NQ2 may be maintained as the low level L, and the voltage of the first inverted control node NQB1 may be maintained as the high level H. The eleventh transistor T11 may transfer the second clock signal CLK2 to the second inverted control node NQB2, and the voltage of the second inverted control node NQB2 may be substantially the same as the second clock signal CLK2. The twelfth transistor T12 may be turned off when the second clock signal CLK2 has the low level L. Thus, even when the voltage of the second inverted control node NQB2 has the low level L, the voltage of the third inverted control node NQB3 may be maintained as the high level H. Turn-on states of the second and third transistors T2 and T3 may be maintained, and the emission signal EM and the carry signal CR may be respectively maintained as the first low gate voltage VGL1 and the second low gate voltage VGL2.

At the third time point TP3, as illustrated in FIGS. 2 and 5, the input signal SIN having the high level H may be applied, and the first clock signal CLK1 may be changed to the high level H. The sixth and tenth transistors T6 and T10 may be turned on in response to the first clock signal CLK1. The sixth transistor T6 may transfer the input signal SIN having the high level H to the first control node NQ1, and the voltage of the first control node NQ1 may become the high level H. The ninth transistor T9 may be turned on in response to the voltage of the first control node NQ1 having the high level H. The first and second stress relieving transistors T13 and T16 may be turned on in response to the high gate voltage VGH. The first stress relieving transistor T13 may transfer the voltage of the first control node NQ1 having the high level H to the second control node NQ2, and the voltage of the second control node NQ2 may become the high level H. Fourth, fifth and seventh transistors T4, T5 and T7 may be turned on in response to the voltage of the second control node NQ2. The fourth transistor T4 may transfer the high gate voltage VGH to the emission signal output node NEMO, and the fifth transistor T5 may transfer the high gate voltage VGH to the carry signal output node NCRO. However, if gate-source voltages Vgs of the fourth and fifth transistors T4 and T5 become lower than threshold voltages of the fourth and fifth transistors T4 and T5, the fourth and fifth transistors T4 and T5 may be turned off. Thus, the emission signal output node NEMO and the carry signal output node NCRO may not reach the high gate voltage VGH, and may be lower than the high gate voltage VGH. Accordingly, a voltage lower than the high gate voltage VGH may be output as the emission signal EM having an intermediate high level H' at the emission signal output node NEMO, and a voltage lower than the high gate voltage VGH may be output as the carry signal CR having an intermediate high level H' at the carry signal output node NCRO.

Further, at the third time point TP3, the voltage of the first inverted control node NQB1 may be maintained as the high level H, and the eighth and eleventh transistors T8 and T11 may be turned on in response to the voltage of the first inverted control node NQB1 having the high level H. A first transistor T1 may be turned on in response to the voltage of the first control node NQ1 having the high level H. The first transistor T1 may transfer a third low gate voltage VGL3 to the third inverted control node NQB3, and the voltage of third inverted control node NQB3 may become the third low gate voltage VGL3 as the low level L. In some embodiments, the voltage of the third low gate voltage VGL3 may be lower than the first low gate voltage VGL1 and the second low gate voltage VGL2. In this case, gate-source voltage Vgs of the second and third transistors T2 and T3 may be negative voltages. The eighth transistor T8 may transfer the first low gate voltage VGL1 to a second electrode of a third capacitor C3, and a voltage of the second electrode of the third capacitor C3 may become the low level L. Thus, a first electrode of the third capacitor C3 may have a voltage having the high level H, and the second electrode of the third capacitor C3 may have the voltage having the low level L.

At a fourth time point TP4, as illustrated in FIGS. 2 and 6, a turn-on state of the seventh transistor T7 may be maintained, and the second clock signal CLK2 may be changed to the high level H. If the second clock signal CLK2 is changed to the high level H while the seventh transistor T7 is turned on, the voltage of the second electrode of the third capacitor C3 may become the high level H, and the voltage of the first electrode of the third capacitor C3, or the voltage of the second control node NQ2 may become the boosted high level BH. That is, the voltage of the second control node NQ2 may be boosted by the third capacitor C3, and thus the fourth and fifth transistors T4 and T5 may readily transfer the high gate voltage VGH to the emission signal output node NEMO and the carry signal output node NCRO. Accordingly, the high gate voltage VGH may be output as the emission signal EM having the high level H at the emission signal output node NEMO, and the high gate voltage VGH may be output as the carry signal CR having the high level H at the carry signal output node NCRO. Although the voltage of the second control node NQ2 has the boosted high level BH, the first stress relieving transistor T13 may prevent or reduce the boosted voltage of the second control node NQ2 from being transferred to the first control node NQ1. Accordingly, stresses to the first, sixth, ninth and fifteenth transistors T1, T6, T9 and T15 coupled to the first control node NQ1 may be relieved or relaxed. The ninth and twelfth transistors T9 and T12 and the second stress relieving transistor T14 may be turned on, and the voltages of the first and second inverted control nodes NQB1 and NQB2 may have the low level L. Further, the first transistor T1 may be turned on in response to the voltage of the first control node NQ1 having the high level H, and may transfer the third low gate voltage VGL3 to the third inverted control node NQB3. Thus, the voltage of the third inverted control node NQB3 may be the third low gate voltage VGL3 lower than the first low gate voltage VGL1 and the second low gate voltage VGL2, and the second and third transistors T2 and T3 may have negative gate-source voltages Vgs. Accordingly, a first leakage current IL1 from the carry signal output node NCRO through the third transistor T3 to a line of the second low gate voltage VGL2 may be prevented or reduced, a second leakage current IL2 from the emission signal output node NEMO through the second transistor T2 to a line of the first low gate voltage VGL1 may be prevented or reduced, and a waveform distortion of the emission signal EM and the carry signal CR may be prevented or reduced.

At a fifth time point TP5, the voltage of the third inverted control node NQB3 may be changed to the high level H, and the emission signal EM and the carry signal CR may be respectively changed to the first low gate voltage VGL1 and the second low gate voltage VGL2 as the low level L.

At a sixth time point TP6, the voltage of the second control node NQ2 may be changed to the high level H, and the emission signal EM and the carry signal CR may be changed to the voltage higher than the first and second low gate voltages VGL1 and VGL2 as the intermediate high level H'.

At a seventh time point TP7, the voltage of the second control node NQ2 may be boosted, and the emission signal EM and the carry signal CR may become the high gate voltage VGH as the high level H.

Although FIG. 2 illustrates an example where the input signal SIN may be sequentially changed from a high level to a low level, to a high level, to a low level and to a high level within one frame period, and the emission signal EM and the carry signal CR may be sequentially changed from a high level to a low level, to an intermediate high level H', to a high level, to a low level, to an intermediate high level H', and to a high level within one frame period based on the input signal SIN, waveforms of the input signal SIN, the emission signal EM and the carry signal CR are not limited to the example of FIG. 2. For example, the input signal SIN may be sequentially changed from a high level to a low level and to a high level within one frame period, and the emission signal EM and the carry signal CR may be sequentially changed from a high level to a low level and to a high level within one frame period based on the input signal SIN.

Figure 7:
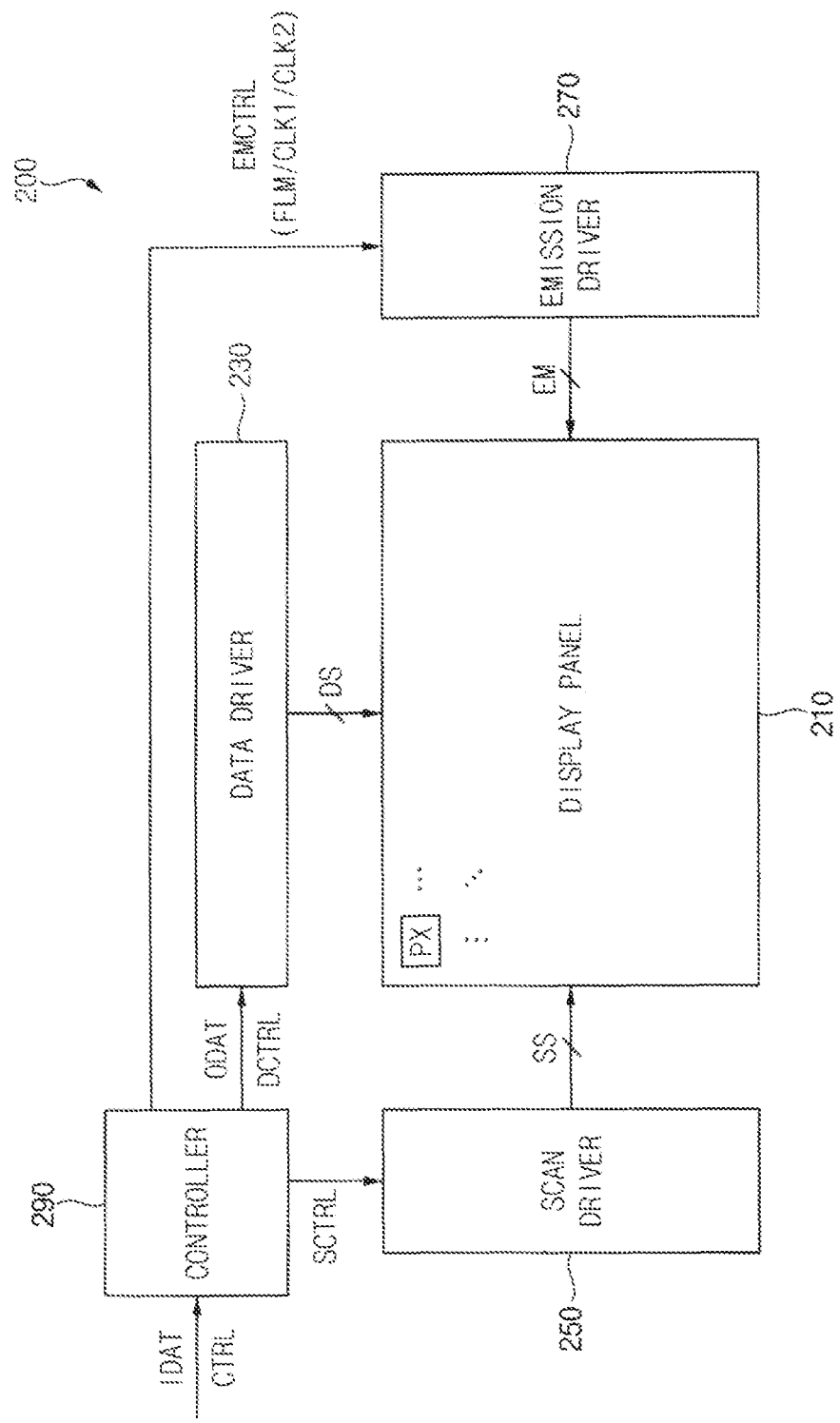
FIG. 7 is a block diagram illustrating a display device including an emission driver according to embodiments.
Figure 8:
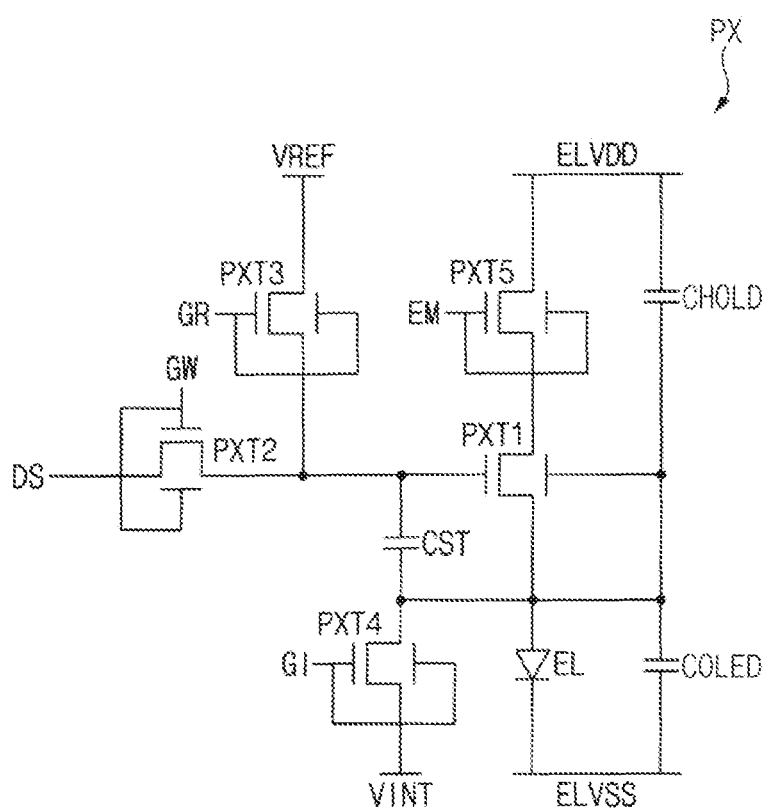
FIG. 8 is a circuit diagram illustrating an example of a pixel included in a display device of FIG. 7.
Figure 9:
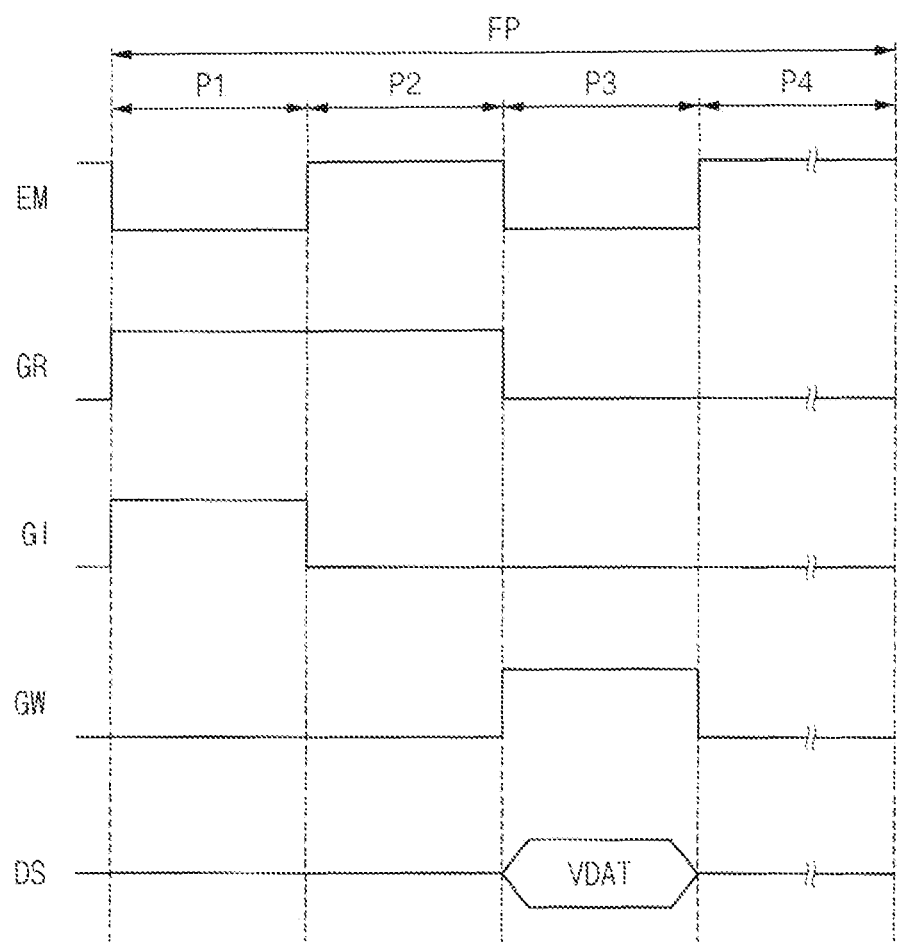
FIG. 9 is a timing diagram for describing an example of an operation of a pixel of FIG. 8.
Figure 10:
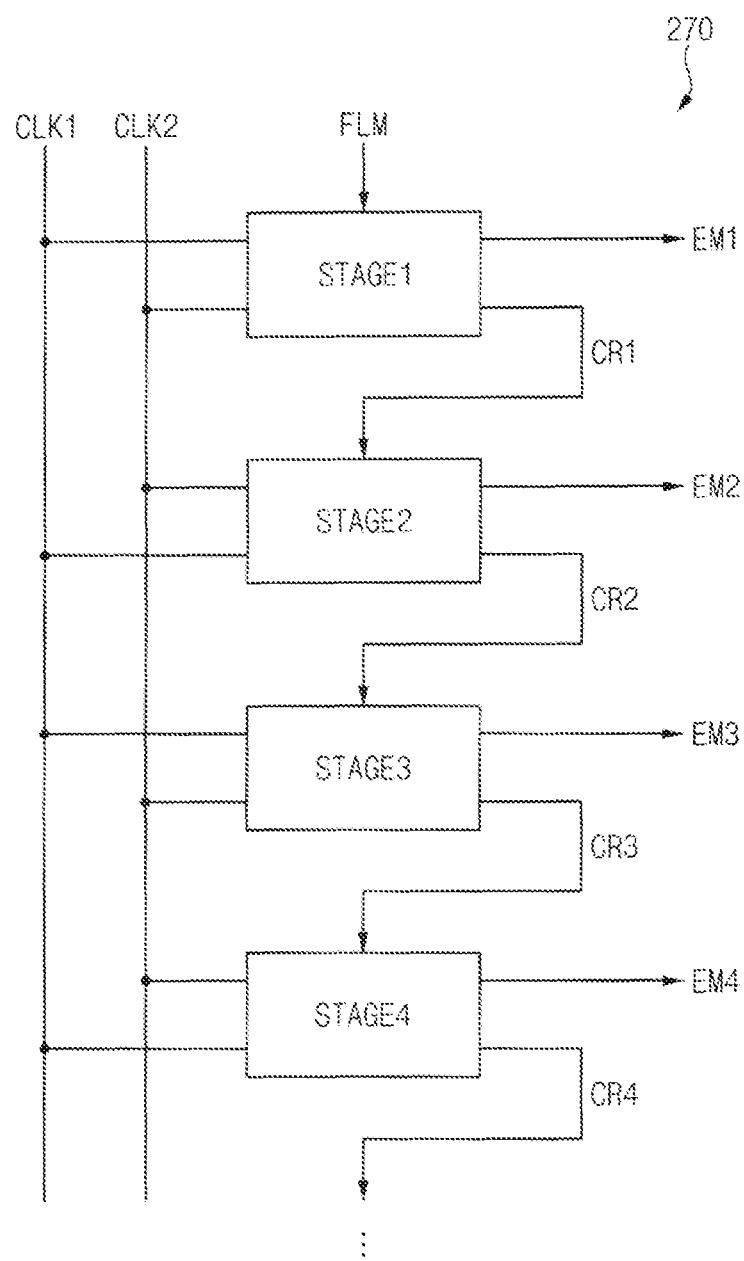
FIG. 10 is a block diagram illustrating an emission driver according to embodiments.
Figure 11:
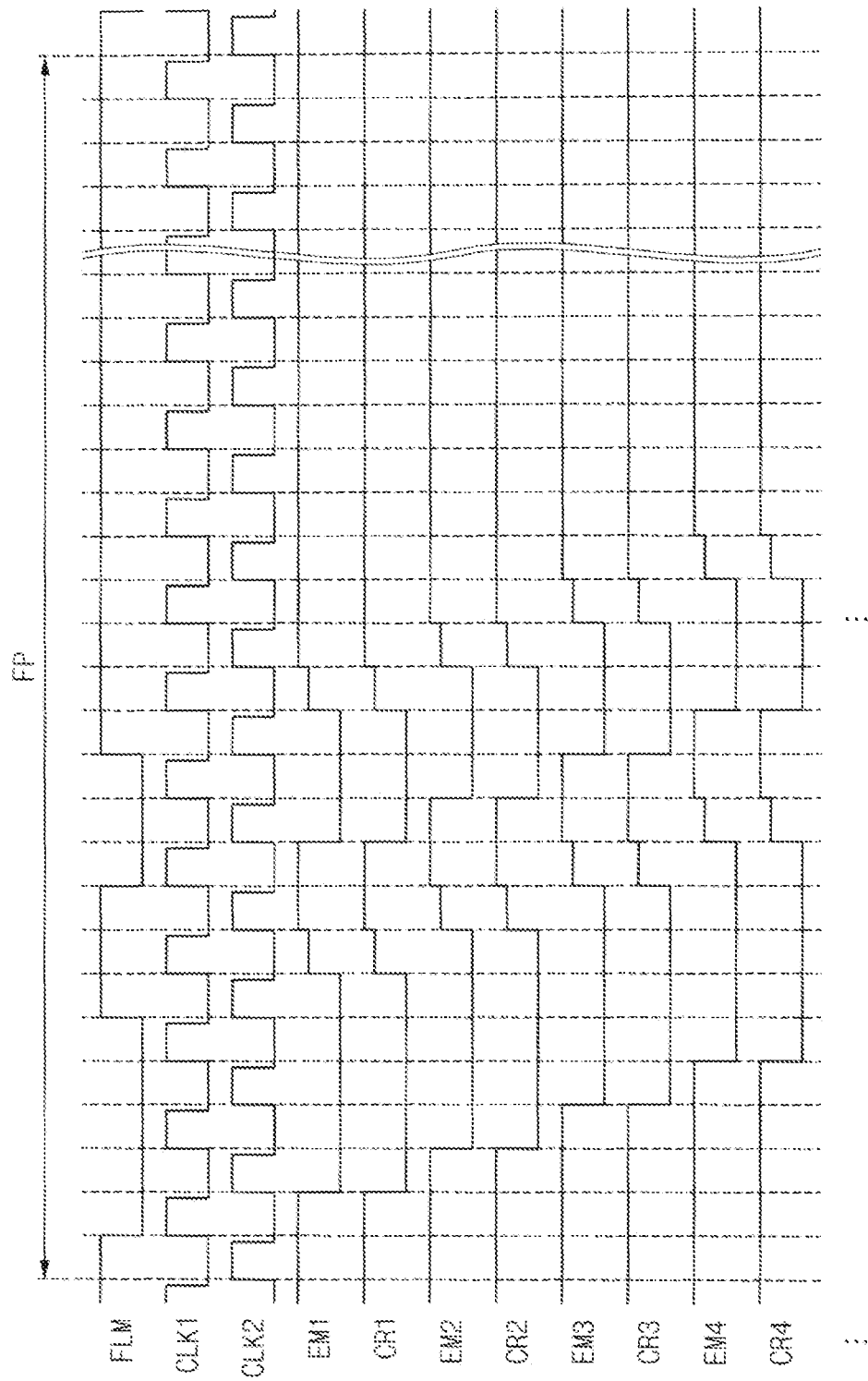
FIG. 11 is a timing diagram for describing an example of an operation of an emission driver of FIG. 10.

FIG. 7 is a block diagram illustrating a display device including an emission driver according to embodiments, FIG. 8 is a circuit diagram illustrating an example of a pixel included in a display device of FIG. 7, FIG. 9 is a timing diagram for describing an example of an operation of a pixel of FIG. 8, FIG. 10 is a block diagram illustrating an emission driver according to embodiments, and FIG. 11 is a timing diagram for describing an example of an operation of an emission driver of FIG. 10.

Referring to FIG. 7, a display device 200 according to embodiments may include a display panel 210 that includes a plurality of pixels PX, a data driver 230 that provides data signals DS to the plurality of pixels PX, a scan driver 250 that provides scan signals SS to the plurality of pixels PX, an emission driver 270 that provides emission signals EM to the plurality of pixels PX, and a controller 290 that controls the data driver 230, the scan driver 250 and the emission driver 270.

The display panel 210 may include data lines, scan lines, emission lines and the plurality of pixels PX coupled thereto. In some embodiments, each pixel PX may include at least one capacitor, at least two transistors and an organic light emitting diode (OLED), and the display panel 210 may be an OLED display panel. Further, in some embodiments, the transistors of each pixel PX may be oxide transistors or NMOS transistors.

For example, as illustrated in FIG. 8, each pixel PX may include a first transistor PXT1, a second transistor PXT2, a third transistor PXT3, a fourth transistor PXT4, a fifth transistor PXT5, a storage capacitor CST, a hold capacitor CHOLD, an OLED EL and a diode capacitor COLED. The third transistor PXT3 may transfer a reference voltage VREF to a gate node of the first transistor PXT1 and a first electrode of the storage capacitor CST in response to a gate reset signal GR, and the fourth transistor PXT4 may transfer an initialization voltage VINT to a second electrode of the storage capacitor CST, an anode of the OLED EL, a second electrode of the hold capacitor CHOLD and a first electrode of the diode capacitor COLED in response to a gate initialization signal GI. The second transistor PXT2 may transfer the data signal DS to the first electrode of the storage capacitor CST in response to a gate writing signal GW, and the storage capacitor CST may store the data signal DS along with the hold capacitor CHOLD and the diode capacitor COLED. The first transistor PXT1 may generate a driving current based on the data signal DS stored in the storage capacitor CST. The fifth transistor PXT5 may form a path of the driving current from a line of a first power supply voltage ELVDD to a line of a second power supply voltage ELVSS in response to the emission signal EM. The OLED EL may emit light based on the driving current. The hold capacitor CHOLD may include a first electrode coupled to the line of the first power supply voltage ELVDD, and a second electrode coupled to a bottom gate of the first transistor PXT1. The diode capacitor COLED may include a first electrode coupled to the bottom gate of the first transistor PXT1 and the second electrode of the hold capacitor CHOLD, and a second electrode coupled to the line of the second power supply voltage ELVSS. In some embodiments, the diode capacitor COLED may be a parasitic capacitor of the OLED EL. In some embodiments, the first transistor PXT1, the second transistor PXT2, the third transistor PXT3, the fourth transistor PXT4 and the fifth transistor PXT5 may be oxide transistors or NMOS transistors. Further, in some embodiments, as illustrated in FIG. 8, the first transistor PXT1, the second transistor PXT2, the third transistor PXT3, the fourth transistor PXT4 and the fifth transistor PXT5 may have a dual gate structure including a top gate and a bottom gate. The bottom gate of the first transistor PXT1 may be coupled to the second electrode of the hold capacitor CHOLD.

FIG. 9 illustrates an example of the emission signal EM, the gate reset signal GR, the gate initialization signal GI, the gate writing signal GW and the data signal DS applied to the pixel PX of FIG. 8. As illustrated in FIG. 9, each frame period FP may include a first period P1, a second period P2, a third period P3 and a fourth period P4.

In the first period P1, the emission signal EM may have a low level, and the gate reset signal GR and the gate initialization signal GI may have a high level. The reference voltage VREF may be applied to the first electrode of the storage capacitor CST and the gate node of the first transistor PXT1, and the initialization voltage VINT may be applied to the second electrode of the storage capacitor CST, the second electrode of the hold capacitor CHOLD and the first electrode of the diode capacitor COLED. Accordingly, the storage capacitor CST, the hold capacitor CHOLD, the diode capacitor COLED and the gate and source nodes of the first transistor PXT1 may be initialized.

In the second period P2, the emission signal EM and the gate reset signal GR may have the high level, and the gate initialization signal GI may have the low level. The fifth and first transistors PXT5 and PXT1 may be turned on, and the source node of the first transistor PXT1, or the second electrode of the storage capacitor CST may have a voltage corresponding to a threshold voltage of the first transistor PXT1 subtracted from the reference voltage VREF. Accordingly, the threshold voltage of the first transistor PXT1 may be compensated.

In the third period P3, the emission signal EM, the gate reset signal GR and the gate initialization signal GI may have the low level, the gate writing signal GW may have the high level, and a data voltage VDAT may be applied as the data signal DS. The data voltage VDAT may be applied to the first electrode of the storage capacitor CST, and the storage capacitor CST may store the data voltage along with the hold capacitor CHOLD and the diode capacitor COLED.

In the fourth period P4, the gate reset signal GR, the gate initialization signal GI and the gate writing signal GW may have the low level, and the emission signal EM may have the high level. The first transistor PXT1 may generate the driving current based on the data voltage VDAT stored in the storage capacitor CST, the fifth transistor PXT5 may be turned on in response to the emission signal EM, and the OLED EL may emit light based on the driving current.

Although FIG. 9 illustrates an example of the emission signal EM, the gate reset signal GR, the gate initialization signal GI and the gate writing signal GW, the gate reset signal GR, the gate initialization signal GI and the gate writing signal GW of the display device 200 according to embodiments are not limited to the example of FIG. 9.

Referring again to FIG. 7, the data driver 230 may generate the data signals DS based on output image data ODAT and a data control signal DCTRL received from the controller 290, and may provide the data signals DS to the plurality of pixels PX through the data lines. In some embodiments, the data control signal DCTRL may include, but not limited to, an output data enable signal, a horizontal start signal and a load signal. In some embodiments, the data driver 230 and the controller 290 may be embedded into a single integrated circuit, and the single integrated circuit may be referred to as a timing controller embedded data driver (TED). In other embodiments, the data driver 230 and the controller 290 may be embodied as separate integrated circuits.

The scan driver 250 may generate the scan signals SS based on a scan control signal SCTRL received from the controller 290, and may provide the scan signals SS to the plurality of pixels PX through the scan lines. In some embodiments, the scan control signal SCTRL may include, but not limited to, a scan start signal and a scan clock signal. In some embodiments, the scan signals SS may include the gate reset signal GR, the gate initialization signal GI and the gate writing signal GW illustrated in FIGS. 8 and 9. In some embodiments, the scan driver 250 may be integrated or formed in a peripheral portion of the display panel 210. In other embodiments, the scan driver 250 may be embodied as one or more integrated circuits.

The emission driver 270 may generate the emission signals EM based on an emission control signal EMCTRL received from the controller 290, and may provide the emission signals EM to the plurality of pixels PX through the emission lines. In some embodiments, the emission control signal EMCTRL may include, but not limited to, an emission start signal FLM, a first clock signal CLK1 and a second clock signal CLK2. In some embodiments, the emission driver 270 may be integrated or formed in the peripheral portion of the display panel 210. In other embodiments, the emission driver 270 may be embodied as one or more integrated circuits.

As illustrated in FIG. 10, the emission driver 270 may include a plurality of stages STAGE1, STAGE2, STAGE3, STAGE4, . . . that receives the first clock signal CLK1 and the second clock signal CLK2, and that outputs a plurality of emission signals EM1, EM2, EM3, EM4, . . . and a plurality of carry signals CR1, CR2, CR3, CR4, . . . . A first stage STAGE1 may receive the emission start signal FLM as an input signal, and subsequent stages STAGE2, STAGE3, STAGE4, . . . may receive carry signals CR1, CR2, CR3, CR4, . . . of their previous stages.

Each of the plurality of stages STAGE1, STAGE2, STAGE3, STAGE4, . . . may have a configuration substantially the same as a configuration of a stage 100 illustrated in FIG. 1. For example, each of the plurality of stages STAGE1, STAGE2, STAGE3, STAGE4, . . . may include an input block that transfers the input signal to a control node, a control block that controls an inverted control node and applies a third low gate voltage to the inverted control node in response to a voltage of the control node, an emission signal output block that outputs a high gate voltage as a corresponding emission signal of the plurality of emission signals EM1, EM2, EM3, EM4, . . . in response to the voltage of the control node and outputs a first low gate voltage as the corresponding emission signal in response to a voltage of the inverted control node, and a carry signal output block that outputs the high gate voltage as a corresponding carry signal of the plurality of carry signals CR1, CR2, CR3, CR4, . . . in response to the voltage of the control node and outputs a second low gate voltage different from the first low gate voltage as the corresponding carry signal in response to the voltage of the inverted control node. The third low gate voltage may be different from the first low gate voltage and the second low gate voltage. In some embodiments, the third low gate voltage may be lower than the first low gate voltage and the second low gate voltage. In this case, a leakage current may be prevented or reduced in each of the plurality of stages STAGE1, STAGE2, STAGE3, STAGE4, . . . , and operation reliability of the emission driver 270 may be improved.

Further, as illustrated in FIG. 11, the plurality of stages STAGE1, STAGE2, STAGE3, STAGE4, . . . may sequentially output the plurality of emission signals EM1, EM2, EM3, EM4, . . . and the plurality of carry signals CR1, CR2, CR3, CR4, . . . within one frame period FP. For example, a first stage STAGE1 may output a first emission signal EM1 and a first carry signal CR1 in response to the emission start signal FLM, a second stage STAGE2 may output a second emission signal EM2 and a second carry signal CR2 in response to the first carry signal CR1, a third stage STAGE3 may output a third emission signal EM3 and a third carry signal CR3 in response to the second carry signal CR2, and a fourth stage STAGE4 may output a fourth emission signal EM4 and a fourth carry signal CR4 in response to the third carry signal CR3.

The controller (e.g., a timing controller (TCON)) 290 may receive input image data IDAT and a control signal CTRL from an external host (e.g., an application processor (AP), a graphics processing unit (GPU) or a graphics card). In some embodiments, the control signal CTRL may include, but not limited to, a vertical synchronization signal, a horizontal synchronization signal, an input data enable signal, a master clock signal, etc. The controller 290 may generate the output image data ODAT, the data control signal DCTRL, the scan control signal SCTRL and the emission control signal EMCTRL based on the input image data IDAT and the control signal CTRL. The controller 290 may control an operation of the data driver 230 by providing the output image data ODAT and the data control signal DCTRL to the data driver 230, may control an operation of the scan driver 250 by providing the scan control signal SCTRL to the scan driver 250, and may control an operation of the emission driver 270 by providing the emission control signal EMCTRL to the emission driver 270.

As described above, in the display device 200 according to embodiments, the third low gate voltage applied to the inverted control node of each stage of the emission driver 270 may be different from the first low gate voltage used as a low voltage of the emission signal EM and the second low gate voltage used as a low voltage of the carry signal CR. Accordingly, a leakage current in each stage of the emission driver 270 may be prevented or reduced, and the operation reliability of the emission driver 270 may be improved.

Figure 12:
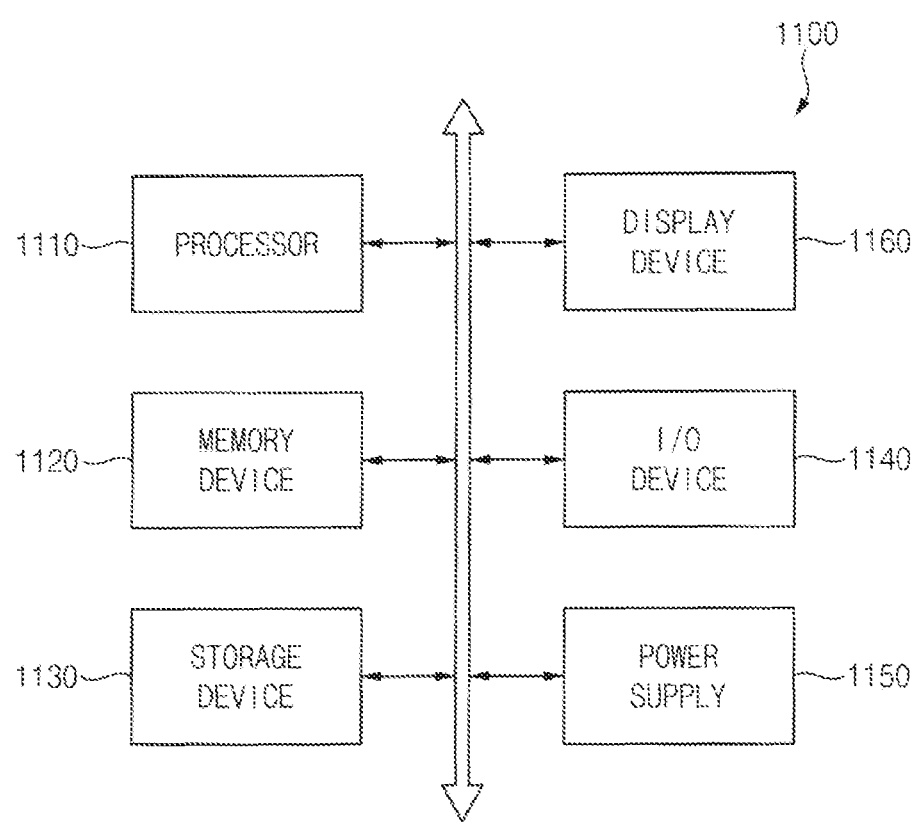
FIG. 12 is an electronic device including a display device according to embodiments.

FIG. 12 is an electronic device including a display device according to embodiments.

Referring to FIG. 12, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a microprocessor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, a third low gate voltage applied to an inverted control node of each stage of an emission driver may be different from a first low gate voltage used as a low voltage of an emission signal and a second low gate voltage used as a low voltage of a carry signal. Accordingly, in the display device 1160 according to embodiments, a leakage current in each stage of the emission driver may be prevented or reduced, and operation reliability of the emission driver may be improved.

The inventive concepts may be applied to any display device 1160, and any electronic device 1100 including the display device 1160. For example, the inventive concepts may be applied to a mobile phone, a smart phone, a wearable electronic device, a tablet computer, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. An emission driver including a plurality of stages, each of the plurality of stages comprising:

an input block transferring an input signal to a control node;
a control block controlling an inverted control node and applying a third low gate voltage to the inverted control node in response to a voltage of the control node;
an emission signal output block outputting a high gate voltage as an emission signal in response to the voltage of the control node and outputting a first low gate voltage as the emission signal in response to a voltage of the inverted control node; and
a carry signal output block outputting the high gate voltage as a carry signal in response to the voltage of the control node and outputting a second low gate voltage different from the first low gate voltage as the carry signal in response to the voltage of the inverted control node,
wherein the third low gate voltage is lower than the first low gate voltage and the second low gate voltage.

2. The emission driver of claim 1, wherein the second low gate voltage is lower than the first low gate voltage.

3. The emission driver of claim 1, wherein all transistors included in each of the plurality of stages are n-type metal oxide semiconductor (NMOS) transistors.

4. The emission driver of claim 1, wherein the control block includes:
a first transistor including a gate coupled to the control node, a first terminal coupled to the inverted control node, and a second terminal receiving the third low gate voltage.

5. The emission driver of claim 4, wherein the control node includes a first control node disposed between a first stress relieving transistor and the input block and a second control node disposed between the first stress relieving transistor and the emission signal output block, and
wherein the gate of the first transistor is coupled to the first control node.

6. The emission driver of claim 5, wherein the first stress relieving transistor includes a gate receiving the high gate voltage, a first terminal coupled to the first control node, and a second terminal coupled to the second control node.

7. The emission driver of claim 4, wherein the emission signal output block includes:
a second transistor including a gate coupled to the inverted control node, a first terminal coupled to an emission signal output node through which the emission signal is output, and a second terminal receiving the first low gate voltage, and
wherein the carry signal output block includes:
a third transistor including a gate coupled to the inverted control node, a first terminal coupled to a carry signal output node through which the carry signal is output, and a second terminal receiving the second low gate voltage.

8. The emission driver of claim 7, wherein the third low gate voltage is lower by a threshold voltage or more of the second transistor than the first low gate voltage.

9. The emission driver of claim 8, wherein the emission signal output block further includes:
a fourth transistor including a gate coupled to the control node, a first terminal receiving the high gate voltage, and a second terminal coupled to the emission signal output node; and
a first capacitor including a first electrode coupled to the inverted control node and a second electrode receiving the first low gate voltage, and
wherein the carry signal output block further includes:

a fifth transistor including a gate coupled to the control node, a first terminal receiving the high gate voltage, and a second terminal coupled to the carry signal output node; and
a second capacitor including a first electrode receiving the high gate voltage and a second electrode coupled to the carry signal output node.

10. The emission driver of claim 9, wherein a capacitance of the second capacitor is greater than a capacitance of the first capacitor.

11. The emission driver of claim 1, wherein the input block includes:
a sixth transistor including a gate receiving a first clock signal, a first terminal receiving the input signal, and a second terminal coupled to the control node.

12. The emission driver of claim 1, wherein each of the plurality of stages further comprises:
a boosting block boosting the voltage of the control node.

13. The emission driver of claim 12, wherein the boosting block includes:
a seventh transistor including a gate coupled to the control node, a first terminal receiving a second clock signal, and a second terminal;
a third capacitor including a first electrode coupled to the control node and a second electrode coupled to the second terminal of the seventh transistor; and
an eighth transistor including a gate coupled to the inverted control node, a first terminal coupled to the second electrode of the third capacitor, and a second terminal receiving the first low gate voltage.

14. The emission driver of claim 1, wherein the inverted control node includes a first inverted control node disposed between a boosting block and a fourth capacitor, a second inverted control node disposed between the fourth capacitor and a twelfth transistor, and a third inverted control node disposed between the twelfth transistor and the emission signal output block, and
wherein the control block includes:
a ninth transistor including a gate coupled to the control node, a first terminal receiving a first clock signal, and a second terminal coupled to the first inverted control node;
a tenth transistor including a gate receiving the first clock signal, a first terminal receiving the high gate voltage, and a second terminal coupled to the first inverted control node;
an eleventh transistor including a gate coupled to the first inverted control node, a first terminal receiving a second clock signal, and a second terminal coupled to the second inverted control node;
the fourth capacitor including a first electrode coupled to the first inverted control node and a second electrode coupled to the second inverted control node;
the twelfth transistor including a gate receiving the second clock signal, a first terminal coupled to the second inverted control node, and a second terminal coupled to the third inverted control node; and
a first transistor including a gate coupled to the control node, a first terminal coupled to the third inverted control node, and a second terminal receiving the third low gate voltage.

15. The emission driver of claim 14, wherein the control block further includes:
a second stress relieving transistor connected between the boosting block and the fourth capacitor, and including a gate receiving the high gate voltage.

16. The emission driver of claim 1, wherein each of the plurality of stages further comprises:
a reset transistor resetting the control node in response to a global reset signal.

17. The emission driver of claim 16, wherein the reset transistor includes a gate receiving the global reset signal, a first terminal coupled to the control node, and a second terminal receiving the first low gate voltage.

18. An emission driver including a plurality of stages, each of the plurality of stages comprising:
a first transistor including a gate coupled to a first control node, a first terminal coupled to a third inverted control node, and a second terminal receiving a third low gate voltage;
a first stress relieving transistor including a gate receiving a high gate voltage, a first terminal coupled to the first control node, and a second terminal coupled to a second control node;
a second transistor including a gate coupled to the third inverted control node, a first terminal coupled to an emission signal output node through which an emission signal is output, and a second terminal receiving a first low gate voltage;
a third transistor including a gate coupled to the third inverted control node, a first terminal coupled to a carry signal output node through which a carry signal is output, and a second terminal receiving a second low gate voltage;
a fourth transistor including a gate coupled to the second control node, a first terminal receiving the high gate voltage, and a second terminal coupled to the emission signal output node;
a first capacitor including a first electrode coupled to the third inverted control node and a second electrode receiving the first low gate voltage;
a fifth transistor including a gate coupled to the second control node, a first terminal receiving the high gate voltage, and a second terminal coupled to the carry signal output node;
a second capacitor including a first electrode receiving the high gate voltage and a second electrode coupled to the carry signal output node;
a sixth transistor including a gate receiving a first clock signal, a first terminal receiving an input signal, and a second terminal coupled to the first control node;
a seventh transistor including a gate coupled to the second control node, a first terminal receiving a second clock signal, and a second terminal;
a third capacitor including a first electrode coupled to the second control node and a second electrode coupled to the second terminal of the seventh transistor;
an eighth transistor including a gate coupled to a first inverted control node, a first terminal coupled to the second electrode of the third capacitor, and a second terminal receiving the first low gate voltage;
a ninth transistor including a gate coupled to the first control node, a first terminal receiving the first clock signal, and a second terminal coupled to the first inverted control node;
a tenth transistor including a gate receiving the first clock signal, a first terminal receiving the high gate voltage, and a second terminal coupled to the first inverted control node;
an eleventh transistor including a gate coupled to the first inverted control node, a first terminal receiving the second clock signal, and a second terminal coupled to a second inverted control node;
a fourth capacitor including a first electrode coupled to the first inverted control node and a second electrode coupled to the second inverted control node;
a twelfth transistor including a gate receiving the second clock signal, a first terminal coupled to the second inverted control node, and a second terminal coupled to the third inverted control node;
a second stress relieving transistor including a gate receiving the high gate voltage, a first terminal coupled to the first inverted control node, and a second terminal coupled to the first electrode of the fourth capacitor; and
a reset transistor including a gate receiving a global reset signal, a first terminal coupled to the first control node, and a second terminal receiving the first low gate voltage.

19. The emission driver of claim 18, wherein the third low gate voltage is lower by a threshold voltage or more of the second transistor than the first low gate voltage and is lower than the second low gate voltage.

20. An electronic device comprising:
a processor configured to provide input image data; and
a display device configured to receive the input image data from the processor and to display an image based on the input image data, the A display device comprising:
a display panel including a plurality of pixels;
a data driver providing data signals to the plurality of pixels;
a scan driver providing scan signals to the plurality of pixels;
an emission driver including a plurality of stages providing emission signals to the plurality of pixels; and
a controller controlling the data driver, the scan driver and the emission driver,
wherein each of the plurality of stages includes:
an input block transferring an input signal to a control node;
a control block controlling an inverted control node and applying a third low gate voltage to the inverted control node in response to a voltage of the control node;
an emission signal output block outputting a high gate voltage as an emission signal in response to the voltage of the control node and outputting a first low gate voltage as the emission signal in response to a voltage of the inverted control node; and
a carry signal output block outputting the high gate voltage as a carry signal in response to the voltage of the control node and outputting a second low gate voltage different from the first low gate voltage as the carry signal in response to the voltage of the inverted control node, and
wherein the third low gate voltage is lower than the first low gate voltage and the second low gate voltage.

* * * * *